United States Patent [19]

Takahashi et al.

[11] Patent Number: 5,672,244

[45] Date of Patent: Sep. 30, 1997

[54] HIGH TEMPERATURE DEINKING METHOD USING AN ALKYLENE OXIDE ADDUCT

[75] Inventors: Hiromichi Takahashi; Koji Hamaguchi, both of Wakayama, Japan

[73] Assignee: Kao Corporation, Tokyo, Japan

[21] Appl. No.: 437,383

[22] Filed: May 9, 1995

[30] Foreign Application Priority Data

May 10, 1994 [JP] Japan .................................. 6-096283

[51] Int. Cl.$^6$ ...................................................... D21C 5/02
[52] U.S. Cl. ................................. 162/5; 162/75; 162/77
[58] Field of Search ............................... 162/5, 77, 75

[56] References Cited

U.S. PATENT DOCUMENTS

| | | |
|---|---|---|
| 5,100,574 | 3/1992 | Urushibata et al. . |
| 5,221,433 | 6/1993 | Daute et al. ............................... 162/5 |
| 5,281,358 | 1/1994 | Urushibata et al. ............... 252/174.21 |
| 5,304,316 | 4/1994 | Urushibata et al. . |

FOREIGN PATENT DOCUMENTS 60-239585 11/1985 Japan .

*Primary Examiner*—Donald E. Czaja
*Assistant Examiner*—Steven B. Leavitt
*Attorney, Agent, or Firm*—Birch, Stewart, Kolasch & Birch, LLP

[57] ABSTRACT

In the deinking of feed waste papers comprising magazines and newspapers at a weight ratio of magazine to newspaper of from 5/95 to 60/40, a reclaimed pulp with excellent qualities can be obtained by adjusting the treating temperature in the flotation step to 40° to 80° C. and adding a deinking agent, which contains an alkylene oxide adduct of an oil or fat, wherein said alkylene oxide adduct comprises ethylene oxide and propylene oxide added at a molar ratio of ethylene oxide to propylene oxide of from 1/1 to 5/1, and has a cloud point of 45° to 90° C., at least in one of the steps of the deinking process.

14 Claims, No Drawings

HIGH TEMPERATURE DEINKING METHOD USING AN ALKYLENE OXIDE ADDUCT

[FIELD OF INDUSTRIAL APPLICATION]

This invention relates to a method for deinking waste papers including magazines and newspapers and a deinking agent to be used therein. More particularly, it relates to a novel deinking method, whereby a reclaimed pulp of excellent qualities (i.e., having a high brightness and contaminated with little unliberated ink) can be obtained by, in the flotation method for giving a reclaimed pulp from printed waste papers such as newspapers and magazines, keeping a high flotation temperature to thereby elevate the circulation rate of a recycled water while maintaining excellent foaming properties in a cell, and a deinking agent to be used therein.

[PRIOR ART]

It has been a practice to reclaim waste papers including newspapers and magazines. Recent improvements in printing techniques, printing systems and printing ink compositions and, moreover, the utilization of waste papers which have not been collected before have made it necessary to develop equipment and methods for further facilitating deinking.

In order to remove inks and other impurities from waste paper, there have been used alkaline agents such as caustic soda, sodium silicate, sodium carbonate and sodium phosphate, bleaching agents such as hydrogen peroxide, hydrosulfites and hypochlorites and sequestering agents such as EDTA and DTPA together with deinking agents including anionic surfactants such as alkylbenzenesulfonates, higher alcohol sulfates, α-olefinsulfonates and dialkyl sulfosuccinates, ethylene oxide adducts of higher alcohols, alkylphenols and fatty acids, and nonionic surfactants such as alkanolamides, either alone or in the form of a mixture of two or more. Although these deinking agents show excellent foaming properties in the flotation treatment, their abilities to collect inks are limited. In the washing method, on the other hand, they are poor in detergency and, furthermore, the good foaming properties thereof cause troubles in draining. As a result, only a deinked pulp of a low grade can be obtained thereby. Even though a pulp of a high brightness is obtained, the dark color restricts the utilization of the deinked pulp (for example, employed in a decreased amount under the surface of cardboard or added in a decreased amount to newspapers). Alternatively it is unavoidable to elevate the amount of a bleaching agent so as to do away the darkness.

In order to overcome these problems, the present inventors have previously proposed to use a reaction product, which is obtained by adding an alkylene oxide to a mixture of a natural oil or fat with a polyhydric (trihydric or higher) alcohol, as a deinking agent (Japanese Patent Laid-Open No. 239585/1985) and to use a glycerol ester mixture, which is obtained by adding ethylene oxide and propylene oxide at a specific ratio to a mixture comprising a natural oil or fat and a glycerol ester originating in this oil or fat and containing a monoglyceride, a diglyceride and a triglyceride at a specific ratio, as a deinking agent (U.S. Pat. No. 5,100,574 corresponding to Japanese Patent Laid-Open No. 139486/1990).

In recent years, meanwhile, examinations have been made to reuse hot water in the deinking process in order to promote the tendency toward the closed watering system. In particular, paper mills having pulp plants for deinking newspapers are also equipped with thermomechanical pulp plants. Attempts have been made to efficiently use warm drainage from these thermomechanical pulp plants in deinking pulp plants.

Accordingly, there arises a temperature rise in each step and thus it is frequently observed that the temperature of a pulp slurry in a flotator exceeds 40° C. When such a deinking agent as those described above is used under these conditions, only a small volume of foam is formed in the flotation step, which brings about some problems such that the ink once liberated get back to the pulp slurry or the ability to collect ink is deteriorated, thus failing to give a reclaimed pulp with a good appearance.

In such a case, it is necessary to effect the operation at a lower flotation temperature by blending the hot water (recycled water) with cold fresh water. As a result, it becomes impossible to elevate the circulation rate of the recycled water. In addition, the utility cost of the plant as a whole cannot be sufficiently cut down.

Also U.S. Pat. No. 5,304,316 has disclosed a deinking method with the use of an oil or fat adduct.

[DISCLOSURE OF INVENTION]

It is an object of the present invention to provide a deinking method, whereby a reclaimed pulp with excellent qualities can be obtained while maintaining the flotation temperature at a high level (i.e., 40°–80° C.) and the circulation rate of recycled water can be elevated since warm drainage is usable, and a deinking agent.

In order to solve the above-mentioned problems, the present inventors have conducted extensive studies. As a result, they have successfully found out that a reclaimed pulp with excellent qualities can be obtained and the circulation rate of recycled water can be elevated by using a deinking agent which contains an alkylene oxide adduct of an oil or fat and has a cloud point of from 45° to 90° C. and controlling the flotation temperature to a high level of from 40° to 80° C., thus completing the present invention.

Accordingly, the present invention provides a high temperature deinking method characterized in that, in the deinking of feed waste papers comprising magazines and newspapers at a weight ratio of magazine to newspaper of from 5/95 to 60/40, the treating temperature in the flotation step is adjusted to 40° to 80° C. and a delnking agent containing an alkylene oxide adduct of an oil or fat and having a cloud point of 45° to 90° C. is added at least in one of the steps of the deinking process.

In other words, the present invention provides a high temperature deinking method wherein the feed waste papers comprise magazines and newspapers at a weight ratio of magazine to newspaper of from 5/95 to 60/40, a deinking agent containing an alkylene oxide adduct of an oil or fat and having a cloud point of 45° to 90° C. is added at least in one of the steps of the deinking process, and the flotation step is effected at a temperature of from 40° to 80° C.

It is preferable that the alkylene oxide adduct has ethylene oxide and propylene oxide added as the alkylene oxide at a molar ratio of ethylene oxide to propylene oxide of from 1/1 to 5/1. Alternatively, the alkylene oxide adduct has ethylene oxide and propylene oxide added as the alkylene oxide at a molar ratio of ethylene oxide to propylene oxide of from 1.5/1 to 4/1 and at a ratio of 50 to 120 mol of ethylene oxide per mol of the oil or fat.

The alkylene oxide adduct of an oil or fat to be used in the present invention can be obtained by a publicly known method, i.e., mixing the oil or fat with a monohydric or polyhydric alcohol (preferably glycerol), subjecting the mixture to transesterification and then adding a given amount of the alkylene oxides thereto. It is also possible to obtain the alkylene oxide adduct of an oil or fat by mixing the oil or fat with glycerol and adding the alkylene oxides thereto under such conditions as to allow the occurrence of the transesterification.

Examples of the oil or fat constituting the alkylene oxide adduct to be used in the present invention include vegetable oils such as coconut oil, palm oil, olive oil, soybean oil, rapeseed oil, linseed oil, castor oil and sunflower oil, land animal oil or fats such as lard, beef tallow and bone oil or fat, marine animal oil or fats such as sardine oil and herring oil, those obtained by hardening or semi-hardening these oil or fats and those recovered in the refining process thereof. Ethylene oxide and propylene oxide are preferable as the alkylene oxide. These alkylene oxides may be added by either random addition or block addition.

It is necessary that the cloud point of the deinking agent containing the alkylene oxide adduct of an oil or fat to be used in the present invention falls within a range of from 45° to 90° C., preferably from 50° to 70° C. When the cloud point is lower than 45° C., only an extremely small foam volume can be formed in the flotation cell, which results in a decrease in the efficiency of the elimination of the ink in the flotation step. When the cloud point exceeds 90° C., on the other hand, the affinity of the deinking agent for the ink is deteriorated and thus the ink cannot be sufficiently liberated or collected, which makes it impossible to obtain a reclaimed pulp with an excellent appearance.

In the present invention, the cloud point is determined in the following manner.

<Determination of Cloud Point>

A 2% by weight aqueous solution of a deinking agent is prepared and heated to a temperature higher than its cloud point to thereby make the solution cloudy. Then the cloudy aqueous solution is gradually cooled and the temperature at which the aqueous solution becomes transparent is taken as the cloud point.

An alkylene oxide adduct of an oil or fat having a cloud point of from 45° to 90° C. can be obtained by appropriately controlling the ratio of the oil or fat to the alcohol, selecting appropriate alkylene oxides and regulating the molar ratio thereof. Regarding the ratio of oil or fat to glycerol, for example, it is proper that the molar ratio of oil or fat to glycerol ranges from 0.3 to 2. Ethylene oxide (EO) and propylene oxide (PO) are preferable as the alkylene oxide. These alkylene oxides may be added by either random addition or block addition. It is preferable that the number of moles of the alkylene oxide added ranges from 50 to 120 per mol of the oil or fat. The molar ratio of EO to PO preferably ranges from 1 to 5, still preferably from 1.5 to 4.

It is also possible to add a monoglyceride and a diglyceride to an oil or fat as an alternative to the above-mentioned method comprising adding glycerol to an oil or fat and effecting transesterification. In short, it will suffice when the weight ratio of the monoglyceride, diglyceride and triglyceride in the alkylene oxide adduct falls within a ranges of 12–50/15–48/1–42.

In the deinking method according to the present invention, the deinking agent, which contains the alkylene oxide adduct of oil or fat obtained above and has a cloud point of from 45° to 90° C., may be added in at least one of the steps of the deinking process, for example, the pulping step, the high concentration bleaching step and the pre-flotation step. The amount of addition thereof preferably ranges from 0.03 to 1.0% by weight based on the feed waste paper. The pre-flotation step is effected by introducing the pulp into a tank prior to the flotation.

In the present invention, the feed waste papers contain magazines and newspapers at a weight ratio of magazine to newspaper of 5/95 to 60/40. When this weight ratio is lower than 5/95, the ink in the newspapers are dispersed in the pulping step, which causes a decrease in the brightness. When this weight ratio exceeds 60/40, on the other hand, the pulpability is deteriorated and the pulp is contaminated with much unliberated ink and sticky matters.

As described above, the deinking method of the present invention is applicable to a case where the temperature of a pulp slurry in a flotator exceeds 40° C. due to the reuse of hot water. Even at such a high temperature, the deinking method of the present invention makes it possible to attain a large foam volume. Thus the ink once liberated would not get back to the pulp slurry and the ink can be collected at a high efficiency, which makes it possible to give a reclaimed pulp of an excellent appearance. When the treating temperature in the flotation step exceeds 80° C., however, the foam volume in the flotation cell becomes insufficient and thus the efficiency of the elimination of the ink is lowered.

In the present invention, although an excellent deinking effect can be obtained by using a deinking agent containing an alkylene oxide adduct of an oil or fat and having a cloud point of from 45° to 90° C. alone, it is also possible to use a conventionally known deinking agent therewith.

Examples of the conventionally known deinking agent include higher alcohol sulfates, polyoxyalkylene higher alcohol sulfates, alkylbenzenesulfonates, fatty acids and salts thereof, alkylene oxide adducts of higher alcohols or alkylphenols, fatty acid alkylene oxide adducts, oil or fat alkylene oxide adducts, mono-, di- and trialkylglyceride alkylene oxide adducts and alkylene oxide adducts of polyhydric alcohol partial or complete esters.

A particularly excellent deinking performance can be achieved by using the deinking agent of the present invention together with a fatty acid or its salt from among the above-mentioned deinking agents.

Examples of the fatty acid and its salt to be used together with the deinking agent of the present invention include fatty acids having 8 to 24 carbon atoms and salts thereof, more specifically those obtained from natural products such as caprylic, capric, lauric, palmitic, stearic, oleic and behenic acids, coconut oil fatty acids, soybean oil fatty acids, rapeseed fatty acids, tall oil fatty acids, castor oil fatty acids, beef tallow fatty acids, palm oil fatty acids and fish oil fatty acids each composed of the above-mentioned fatty acids, and hydrogenation products of these fatty acids; and synthetic fatty acids. Preferable examples of the salt include sodium and potassium salts. When employed together, the weight ratio of alkylene oxide adduct of an oil or fat to fatty acid or its salt is preferably from 30/70 to 70/30.

Because of the excellent foaming properties, the deinking method of the present invention is effective in a pulp-deinking plant equipped with a flotator of low retention type such as one of the PDM (pressurized deinking module) type [J. Japan. Tech. Assoc. Pulp Paper Ind., 44 (7), 23]. The above-mentioned flotator of the PDM type is exemplified by Mitsubishi-Beloit (Jones) (trade name) manufactured by Mitsubishi Jukogyo K.K. by which bubbles in various sizes are formed and the froth is liberated into the atmosphere at once by pressurization. The steps in the PDM may be roughly classified into a bubbling zone where air is dissolved and bubbles are formed, a mixing zone where the starting materials are mixed together, a bubble-separation zone where bubbles having the ink adsorbed thereby are separated from the material with excellent qualities and a forth-separation zone where the froth reject is separated.

[EXAMPLES]

To further illustrate the present invention in greater detail, and not by way of limitation, the following Examples will be given.

Unless otherwise noted, each percentage in the Example is given by weight.

Example 1

As the feed waste papers, those having magazine to newspaper weight ratios of 5/95, 20/80, 40/60 and 60/40 were employed and deinked by the following method. Each feed waste paper contained 8% of mixed office waste papers.

The feed waste paper was cut into pieces (2×5 cm) and fed into a bench disintegrator. Then 1% (based on the feed waste paper) of caustic soda, 3% (based on the feed waste paper) of sodium silicate, 3% (based on the feed waste paper) of 30% hydrogen peroxide, 0.4% (based on the feed waste paper) of each deinking agent listed in Table 1 and water were added thereto. After disintegrating at a pulp concentration of 5% at 50° C., for 10 minutes, the mixture was aged at 50° C. for 60 minutes. After adding water to the mixture so as to give a pulp concentration of 1%, flotation was effected at 50° C. for 10 minutes. After the completion of the flotation, the pulp slurry was concentrated to give a concentration of 10%. Subsequently, the pulp slurry was diluted with water so as to return the pulp concentration to 1% and then treated with a TAPPI sheet machine to thereby give a pulp sheet.

The brightness and the percentage area of remaining ink spots of the obtained pulp sheet were determined. Also, the foam volume at the flotation was measured. Tables 2, 3, 4 and 5 show respectively the results obtained by using the feed waste papers having magazine to newspaper weight ratios of 5/95, 20/80, 40/60 and 60/40.

TABLE 2

Magazine/newspaper = 5/95 (by weight)

Qualities of deinked pulp

| Deinking agent no. | Brightness (%) | Percentage area of remaining ink spot (%) | Foam volume (ml) at flotation |
|---|---|---|---|
| Invention product | | | |
| 1 | 51.6 | 0.32 | 390 |
| 2 | 51.3 | 0.36 | 360 |
| 3 | 52.3 | 0.29 | 320 |
| 4 | 51.5 | 0.41 | 410 |
| 5 | 52.1 | 0.30 | 450 |
| 6 | 52.4 | 0.24 | 390 |
| Comparative product | | | |
| 7 | 48.0 | 0.94 | 180 |
| 8 | 47.5 | 1.10 | 145 |
| 9 | 46.1 | 1.24 | 90 |

TABLE 3

Magazine/newspaper = 20/80 (by weight)

Qualities of deinked pulp

| Deinking agent no. | Brightness (%) | Percentage area of remaining ink spot (%) | Foam volume (ml) at flotation |
|---|---|---|---|
| Invention product | | | |
| 1 | 54.3 | 0.18 | 450 |
| 2 | 53.7 | 0.24 | 410 |
| 3 | 55.0 | 0.19 | 370 |
| 4 | 53.8 | 0.25 | 480 |

TABLE 1

| | Synthetic deinking agent | | | | | |
|---|---|---|---|---|---|---|
| | | Glycerol ester composition | Alykylene oxide | | Cloud point/°C. | |
| Deinking agent No. | Oil or fat | ratio (wt.) mono/di/tri | Mol no. of EO | EO/PO ratio | 2% aq. soln. | Addition of EO/PO |
| Invention Product | | | | | | |
| 1 | linseed oil | 12/51/37 | 30 | 4 | 46 | random |
| 2 | fish oil | 18/42/40 | 70 | 3.5 | 51 | random |
| 3 | beef tallow | 29/48/23 | 56 | 3 | 61 | block |
| 4 | rapeseed oil | 32/42/26 | 80 | 2.5 | 69 | block |
| 5 | beef tallow | 52/39/9 | 100 | 5 | 78 | random |
| 6 | fish oil | 50/43/7 | 120 | 4 | 87 | random |
| Comparative product | | | | | | |
| 7 | beef tallow | 8/35/57 | 50 | 2 | 42 | random |
| 8 | coconut oil | 10/31/59 | 33 | 1.5 | 35 | random |
| 9 | fish oil | 5/32/63 | 42 | 0.7 | 26 | block |

TABLE 3-continued

Magazine/newspaper = 20/80 (by weight)

Qualities of deinked pulp

| Deinking agent no. | Brightness (%) | Percentage area of remaining ink spot (%) | Foam volume (ml) at flotation |
|---|---|---|---|
| 5 | 54.6 | 0.20 | 520 |
| 6 | 54.0 | 0.21 | 435 |
| Comparative product | | | |
| 7 | 50.2 | 0.76 | 220 |
| 8 | 49.0 | 0.89 | 190 |
| 9 | 47.5 | 1.07 | 120 |

TABLE 4

Magazine/newspaper = 40/60 (by weight)

Qualities of deinked pulp

| Deinking agent no. | Brightness (%) | Percentage area of remaining ink spot (%) | Foam volume (ml) at flotation |
|---|---|---|---|
| Invention product | | | |
| 1 | 55.9 | 0.22 | 485 |
| 2 | 55.3 | 0.20 | 440 |
| 3 | 56.3 | 0.15 | 425 |
| 4 | 54.9 | 0.26 | 490 |
| 5 | 55.8 | 0.17 | 535 |
| 6 | 55.4 | 0.20 | 470 |
| Comparative product | | | |
| 7 | 52.5 | 0.78 | 235 |
| 8 | 51.6 | 0.80 | 200 |
| 9 | 50.9 | 0.92 | 140 |

TABLE 5

Magazine/newspaper = 60/40 (by weight)

Qualities of deinked pulp

| Deinking agent no. | Brightness (%) | Percentage area of remaining ink spot (%) | Foam volume (ml) at flotation |
|---|---|---|---|
| Invention product | | | |
| 1 | 57.2 | 0.16 | 505 |
| 2 | 57.1 | 0.18 | 460 |
| 3 | 57.8 | 0.14 | 455 |
| 4 | 56.7 | 0.20 | 520 |
| 5 | 57.5 | 0.15 | 555 |
| 6 | 57.1 | 0.21 | 525 |
| Comparative product | | | |
| 7 | 53.8 | 0.63 | 250 |
| 8 | 52.9 | 0.77 | 225 |
| 9 | 52.1 | 0.87 | 180 |

As Tables 2 to 5 clearly show, the deinking method of the present invention, wherein the flotation temperature is elevated and excellent foaming properties are maintained in the flotation step, makes it possible to give a reclaimed pulp having good qualities (i.e., a high brightness and a low percentage area of the remaining ink spots). Also, the circulation rate of the recycled water can be elevated thereby.

Example 2

A feed waste paper [magazine/newspaper=25/75 (by weight), containing 5% of mixed office waste papers] was cut into pieces (2×5 cm) and fed into a bench disintegrator. Then 1% (based on the feed waste paper) of caustic soda, 3% (based on the feed waste paper) of sodium silicate, 3% (based on the feed waste paper) of 30% hydrogen peroxide, 0.35% (based on the feed waste paper) of each deinking agent listed in Table 1 and water were added thereto. After disintegrating at a pulp concentration of 15% at 60° C. for 7 minutes, the mixture was aged at 60° C. for 60 minutes. After adding water to the mixture so as to give a pulp concentration of 1%, flotation was effected at 50° C. for 10 minutes. After the completion of the flotation, the pulp slurry was concentrated to give a concentration of 10%. Subsequently, the pulp slurry was diluted with water so as to return the pulp concentration to 1% and then treated with a TAPPI sheet machine to thereby give a pulp sheet.

The brightness and the percentage area of remaining ink spots of the obtained pulp sheet were determined. Also, the foam volume at the flotation was measured. Table 6 shows the results.

TABLE 6

Qualities of deinked pulp

| Deinking agent no. | Brightness (%) | Percentage area of remaining ink spot (%) | Foam volume (ml) at flotation |
|---|---|---|---|
| Invention product | | | |
| 1 | 53.2 | 0.13 | 570 |
| 2 | 52.9 | 0.19 | 535 |
| 3 | 53.6 | 0.12 | 510 |
| 4 | 52.2 | 0.21 | 575 |
| 5 | 54.0 | 0.16 | 600 |
| 6 | 53.3 | 0.16 | 560 |

TABLE 6-continued

| | Qualities of deinked pulp | | |
|---|---|---|---|
| Deinking agent no. | Brightness (%) | Percentage area of remaining ink spot (%) | Foam volume (ml) at flotation |
| Comparative product | | | |
| 7 | 49.9 | 0.64 | 290 |
| 8 | 48.7 | 0.77 | 240 |
| 9 | 47.6 | 0.89 | 210 |

As Table 6 clearly shows, the deinking method of the present invention, wherein the flotation temperature is elevated and excellent foaming properties are maintained in the flotation step, makes it possible to give a reclaimed pulp having good qualities (i.e., a high brightness and a low percentage area of remaining ink spots). Also, the circulation rate of the recycled water can be elevated thereby.

Example 3

A feed waste paper [magazine/newspaper=30/70 (by weight), containing 5% of mixed office waste papers] was cut into pieces (2×5 cm) and fed into a bench disintegrator. Then 1% (based on the feed waste paper) of caustic soda, 3% (based on the feed waste paper) of sodium silicate, 3% (based on the feed waste paper) of 30% hydrogen peroxide, 0.35% (based on the feed waste paper) of some kind of deinking agent selected from among those listed in Table 1 and water were added thereto. After disintegrating at a pulp concentration of 5% at 60° C. for 10 minutes, the mixture was aged at 60° C. for 60 minutes. After adding water to the mixture so as to give a pulp concentration of 1%, flotation was effected while varying the temperature (40°, 60° and 80° C.) for 10 minutes. After the completion of the flotation, the pulp slurry was concentrated to give a concentration of 10%. Subsequently, the pulp slurry was diluted with water so as to return the pulp concentration to 1% and then treated with a TAPPI sheet machine to thereby give a pulp sheet.

The brightness and the percentage area of remaining ink spots of the obtained pulp sheet were determined. Also, the foam volume at the flotation was measured. Table 7 shows the results.

TABLE 7

| | | Qualitites of deinked pulp | | | |
|---|---|---|---|---|---|
| Flotation temp. (°C.) | Deinking agent no. | Brightness (%) | Percentage area of remaining ink spot (%) | Foam volume (ml) at flotation | Remarks |
| 40 | 1 | 54.9 | 0.17 | 465 | Ex. |
| | 3 | 55.3 | 0.16 | 410 | |
| | 4 | 54.2 | 0.22 | 470 | |
| | 7 | 52.8 | 0.72 | 390 | Comp. |
| | 9 | 48.8 | 1.00 | 135 | Ex. |
| 60 | 1 | 52.9 | 0.37 | 345 | Ex. |
| | 3 | 55.7 | 0.13 | 430 | |
| | 4 | 55.0 | 0.19 | 490 | |
| | 7 | 50.2 | 0.72 | 170 | Comp. |
| | 9 | 47.3 | 1.00 | 110 | Ex. |
| 80 | 1 | 51.2 | 0.43 | 230 | Ex. |

TABLE 7-continued

| | | Qualitites of deinked pulp | | | |
|---|---|---|---|---|---|
| Flotation temp. (°C.) | Deinking agent no. | Brightness (%) | Percentage area of remaining ink spot (%) | Foam volume (ml) at flotation | Remarks |
| | 3 | 52.0 | 0.34 | 290 | |
| | 6 | 54.6 | 0.20 | 485 | |
| | 7 | 46.2 | 1.12 | 60 | Comp. |
| | 9 | 44.7 | 1.67 | 45 | Ex. |

As Table 7 clearly shows, the deinking method of the present invention, wherein the flotation temperature is elevated and excellent foaming properties are maintained in the flotation step, makes it possible to give a reclaimed pulp having good qualities (i.e., a high brightness and a low percentage area of remaining ink spots). Also, the circulation rate of the recycled water can be elevated thereby.

Example 4

A feed waste paper [magazine/newspaper=25/75 (by weight), containing 10% of mixed office waste papers] was cut into pieces (2×5 cm) and fed into a bench disintegrator. Then 0.5% (based on the feed waste paper) of caustic soda, 0.15% (based on the feed waste paper) of each deinking agent listed in Table 1 and water were added thereto. After disintegrating at a pulp concentration of 5% at 60° C. for 10 minutes, the pulp slurry was dehydrated until the pulp concentration reached 20%. Next, 1% (based on the feed waste paper) of caustic soda, 3% (based on the feed waste paper) of sodium silicate, 3% (based on the feed waste paper) of 30% hydrogen peroxide and 0.15% of each deinking agent listed in Table 1 were added thereto. Then the obtained mixture was kneaded and aged at 60° C. for 120 minutes. After the completion of the aging, water was added to the mixture so as to give a pulp concentration of 1% and flotation was effected at 55° C. for 10 minutes. After the completion of the flotation, the pulp slurry was concentrated to give a concentration of 10%. Subsequently, the pulp slurry was diluted with water so as to return the pulp concentration to 1% and then treated with a TAPPI sheet machine to thereby give a pulp sheet.

The brightness and the percentage area of remaining ink spots of the obtained pulp sheet were determined. Also, the foam volume at the flotation was measured. Table 8 shows the results.

TABLE 8

| | Qualities of deinked pulp | | |
|---|---|---|---|
| Deinking agent no. | Brightness (%) | Percentage area of remaining ink spot (%) | Foam volume (ml) at flotation |
| Invention product | | | |
| 1 | 57.1 | 0.11 | 630 |
| 2 | 57.5 | 0.14 | 645 |
| 3 | 58.3 | 0.07 | 720 |
| 4 | 58.0 | 0.09 | 700 |

TABLE 8-continued

| | Qualities of deinked pulp | | |
|---|---|---|---|
| Deinking agent no. | Brightness (%) | Percentage area of remaining ink spot (%) | Foam volume (ml) at flotation |
| 5 | 58.6 | 0.10 | 735 |
| 6 | 59.1 | 0.08 | 715 |
| Comparative product | | | |
| 7 | 53.9 | 0.45 | 430 |
| 8 | 52.4 | 0.51 | 290 |
| 9 | 51.7 | 0.63 | 275 |

As Table 8 clearly shows, the deinking method of the present invention, wherein the flotation temperature is elevated and excellent foaming properties are maintained in the flotation step, makes it possible to give a reclaimed pulp having good qualities (i.e., a high brightness and a low percentage area of remaining ink spots). Also, the circulation rate of the recycled water can be elevated thereby.

We claim:

1. In a deinking method of feed waste papers, a high temperature deinking method for deinking feed waste papers wherein said waste papers comprise magazines and newspapers at a weight ratio of magazine to newspaper of from 5/95 to 60/40, a deinking agent containing an alkylene oxide adduct of an oil or fat, wherein said alkylene oxide adduct comprises ethylene oxide and propylene oxide added at a molar ratio of ethylene oxide to propylene oxide of from 1/1 to 5/1, and having a cloud point of 45° to 90° C. is added at least in one of the steps of the deinking process, and the flotation is effected at a temperature of from 40° to 80° C.

2. The method as set forth in claim 1, wherein said alkylene oxide adduct of an oil or fat has ethylene oxide and propylene oxide added as the alkylene oxide at a molar ratio of ethylene oxide to propylene oxide of from 1.5/1 to 4/1 and in an amount of 50 to 120 mol of ethylene oxide per mol of the oil or fat.

3. The method as set forth in claim 1, wherein said oil or fat is one selected from the group consisting of vegetable oils land animal oil or fats, marine animal oil and fats and oils obtained by hardening or semi-hardening said oils or fats, and those recovered in a refining process thereof.

4. The method as set forth in claim 1, wherein said alkylene oxide adduct of an oil or fat has ethylene oxide and propylene oxide added as the alkylene oxide by random addition or block addition.

5. The method as set forth in claim 1, wherein the deinking process comprises a pulping step, a high concentration bleaching step and a pre-flotation step.

6. The method as set forth in claim 1, wherein the deinking agent is added in an amount of from 0.03 to 1.0% by weight based on the feed waste paper.

7. A high temperature deinking method for deinking waste papers of magazines and newspapers at a ratio of 5/95 to 60/40, respectively by weight comprising:

adding a deinking agent comprising a reaction product of an alkylene oxide adduct of an oil or fat, wherein said alkylene oxide adduct comprises ethylene oxide and propylene oxide added at a molar ratio of ethylene oxide to propylene oxide of from 1/1 to 5/1, and glycerol, and having a cloud point of 45° to 90° C., to at least one step in the deinking process, and conducting a floatation step at a temperature of from 40° to 80° C.

8. The method as set forth in claim 7, wherein the alkylene oxide adduct of an oil or fat is obtained by mixing an oil or fat with glycerol and, subjecting the mixture to transesterification; and after which alkylene oxides are added to the transesterified mixture.

9. The method as set forth in claim 8, wherein polyhydric alcohol is glycerin.

10. The method as set forth in claim 7, wherein said alkylene oxide adduct of an oil or fat has ethylene oxide and propylene oxide added as the alkylene oxide at a molar ratio of ethylene oxide to propylene oxide of from 1.5/1 to 4/1 and in an amount of 50 to 120 mol of ethylene oxide per mol of the oil or fat.

11. The method as set forth in claim 7, wherein said oil or fat is one selected from among vegetable oils land animal oil or fats, bone oil or fat, marine animal oil, and oils and fats obtained by hardening or semi-hardening said oil or fats recovered in a refining process thereof.

12. The method as set forth in claim 7, wherein said alkylene oxide adduct of an oil or fat has ethylene oxide and propylene oxide added as the alkylene oxide by random addition or block addition.

13. The method as set forth in claim 7, wherein the deinking process comprises a pulping step, a high concentration bleaching step and a pre-floatation step.

14. The method as set forth in claim 7, wherein the deinking agent is added in an amount of from 0.03 to 1.0% by weight based on the feed waste paper.

* * * * *